Patented Nov. 17, 1931

1,832,752

UNITED STATES PATENT OFFICE

ARTHUR A. THORETZ, OF NEW YORK, N. Y.

WALL COATING

No Drawing.  Application filed August 1, 1927.  Serial No. 210,023.

This invention relates to wall coatings, and has for an object to provide an improved coating which will act in the double capacity of a preliminary coating of paint and a coating of sizing.

Another object of the invention is to provide a coating for walls and other articles which will close the pores of the walls or other articles, and which at the same time, will present a smooth and more or less high gloss, so that a finishing coat of paint may be readily applied thereto.

In mixing a wall coating embodying the invention, slightly different proportions may be used without departing from the spirit of the invention, but in actual practice, the following ingredients and proportions have been found to produce very desirable results. For a given quantity of solution embodying the invention, the following ingredients are used—

| | |
|---|---|
| Sodium silicate | ½ gallon |
| Water | ½ gallon |
| Formaldehyde | ½ to 1½ ounces |

The sodium silicate may be in crystal form or solution. If the sodium silicate is in a solution, slightly less water may be used. If more water is used, good results are secured, though the coating is thinner. At any time that the coating becomes thick, a small addition of water is always necessary to restore the solution to its proper consistency for application to a wall. The solution may be applied to a wall in any desired manner, but preferably by a brush.

In preparing the coating or solution, the sodium silicate and water are mixed together and stirred for a short time, or until there is a thorough mixture of the two ingredients. After this has been done, the formaldehyde is added and the mixture again well stirred. The various ingredients are mixed while cold, that is, at atmospheric temperature. The water acts in the capacity of a solvent for the silicate and the formaldehyde is added to the mixture to produce a hardening effect.

After the solution of coating has been applied to a wall, it becomes dry in about one hour, and a coating of lead paint or other paint may be applied thereon. In new buildings, or in new walls having new plaster, it has been necessary heretofore to apply three, and sometimes more coatings of lead paint before a desired job is secured. Where the wall is very porous, and there is what is known as a great suction, heretofore it has been customary to apply the sizing to the wall and then two or more coatings of lead paint. By using the wall coating described herein, a very porous wall having great suction will need only one coating of lead paint to produce a finished and permanent job.

When the wall coating embodying the invention is applied to a wall and dries, it leaves a very high gloss which is smooth and which acts to prevent dampness from passing through the wall, in addition to acting as a foundation for the finished coating of lead paint.

What I claim is:

A wall coating, consisting of the following ingredients in substantially the following proportions, sodium silicate one-half gallon, water one-half gallon, and formaldehyde from one-half to one and one-half ounces.

Signed at 271 Madison Ave. in the county of New York and State of New York, this 29th day of July 1929.

ARTHUR A. THORETZ.